United States Patent Office 2,798,104
Patented July 2, 1957

2,798,104

PURIFICATION OF XYLENE-ETHYLBENZENE MIXTURES

Ingolfur Bergsteinsson, Orange, Calif., assignor to Union Oil Company of California, Los Angeles, Calif., a corporation of California No Drawing. Application June 21, 1954, Serial No. 438,346

13 Claims. (Cl. 260—674)

This invention relates to methods for the purification of mixtures of C-8 aromatic hydrocarbons which contain ethylbenzene in addition to at least one of the xylene isomers. More specifically the invention concerns methods for removing the ethylbenzene from the remaining xylenes, whereby the xylenes are rendered more amenable to subsequent separation procedures. The particular method employed consists broadly in subjecting the initial mixture of C-8 hydrocarbons to mild isomerizing, or transalkylation conditions in the presence of a fused-ring hydrocarbon acting as an alkyl acceptor, e. g. naphthalene and the like. The transalkylation conditions employed are carefully selected to avoid both intermolecular and intramolecular isomerization among the xylene isomers. The conditions are also designed to prevent the migration of ethyl groups from ethylbenzene to the xylenes, whereby the latter may be recovered substantially unchanged. In a specific modification of the process an impure mixture containing naphthalene, or methyl naphthalenes and other aromatics and non-aromatics boiling within the same range, is employed as the alkyl acceptor, the naphthalenic component thereof being selectively ethylated thereby providing a means for separating the same from the remaining aromatics and non-aromatics, as for example by distillation.

The principal object of the invention is to provide an economical method for separating ethylbenzene from xylenes. More specifically, the objective is to provide a specific transalkylation process for effecting the transfer of ethyl groups selectively to added acceptor molecules in preference to xylene molecules, under conditions which cause little or no migration of methyl groups. A further object is to provide specific aromatic ethyl-group acceptors which are readily alkylated, and hence permit the use of low temperatures and inexpensive catalysts. A still further object is to provide methods for conveniently separating methyl naphthalenes from narrow boiling range hydrocarbon mixtures which contain other aromatics and non-aromatics. Another objective is to provide economical methods for contacting the C-8 hydrocarbons with large mole-excesses of the fused-ring compound. Other objects and advantages will be apparent to those skilled in the art from the description which follows.

Mixtures of aromatic C-8 hydrocarbon isomers are frequently obtained from the destructive distillation of coal tars and from various petroleum sources such as reformed gasoline fractions. These mixtures ordinarily comprise the four isomers in approximately the thermodynamic equilibrium ratios. Their composition may range for example within the following proportions:

TABLE 1

Ethylbenzene, 10-20% (B. P. 136.1° C.)
p-Xylene, 15-25% (B. P. 138.5° C.)
m-Xylene, 40-60% (B. P. 139.1° C.)
o-Xylene, 15-25% (B. P. 144.4° C.)

For various uses it is desirable to obtain the individual isomers in their pure state. At present pure para-xylene is most highly desirable as a starting material for producing terephthalic acid. The presence of ethylbenzene greatly complicates the resolution of these isomers to obtain pure paraxylene. A convenient method for removing ethylbenzene from such mixtures is hence highly desirable.

It is known generally that alkyl groups will migrate between aromatic nuclei under isomerizing conditions. It is also known that the higher alkyl groups, and especially the more highly branched alkyl groups, migrate more readily than the lower and less branched groups. It would be expected therefore that the ethyl group would be thermally dissociated from a benzene ring more readily than methyl groups. However, the ultimate fate of the dissociated ethyl group is a complicating factor, as is also the fact that it is difficult to maintain and control conditions which are 100% selective in mobilizing ethyl groups but not methyl groups. Dissociated ethyl groups will combine with neighboring xylene molecules until a thermodynamic equilibrium is reached, producing higher-boiling ethyl xylenes. The ultimate yield of xylenes recovered is thereby lessened to the same extent as the conversion of ethylbenzene to benzene, if no extraneous ethyl-group acceptors are present. Moreover, under known transalkylation conditions, some of the methyl groups from the xylenes are also mobilized, resulting in the formation of methyl-ethyl benzenes, toluene, trimethyl benzenes and the like. The resulting mixtures are difficult to purify by fractional distillation because of the wide variety of close-boiling isomers and homologs present.

Moreover, without careful selection of an alkyl acceptor, the particular xylene isomer desired may be selectively ethylated. If any xylene isomer is selectively ethylated, the other xylene isomers will not be in thermodynamic equilibrium, and intramolecular isomerization may take place to reestablish an equilibrium xylene composition. Intramolecular isomerization, i. e. the rearrangement of methyl groups on the same benzene ring, appears to occur more readily than transmigration of ethyl groups between benzene rings; hence regardless of the xylene isomer selectively ethylated by transmigration, the final xylene mixture recovered may have approximately the same composition as the original xylenes, but the overall yield will in any case be reduced.

According to the present invention a molar excess, relative to the ethylbenzene, of a fused-ring compound such as naphthalene is added to the C-8 hydrocarbons. It has been found that the fused-ring compounds are more readily ethylated by transmigration than are the monocyclic aromatics. Hence the selectivity of migration of ethyl groups in preference to methyl groups may be improved by employing milder conditions, e. g. lower temperatures, shorter reaction times, milder catalysts, etc., and relying upon the fused ring compound to combine rapidly with dissociated ethyl groups, thereby hastening the reaction under mild conditions. Under such conditions substantially none of the xylene is ethylated, and the conversion of ethylbenzene to benzene is practically quantitative. Moreover, substantially no migration of methyl groups occurs. It will be observed also that the products of transalkylation are very readily separable by distillation. The principal products may be benzene (B. P. 80° C.), xylenes (B. P. 137-144° C.), naphthalene (B. P. 218° C.), ethyl naphthalenes (B. P. 251-258° C.) and the like. Some higher ethylated naphthalenes may be formed which are not distillable at atmospheric pressure; such products may be purified by fractional crystallization or vacuum distillation.

It has further been found that the mono-alkylated naphthalenes, or other mono-alkyl fused-ring compounds, are still more readily ethylated by trans-alkylation than the non-alkylated parent compounds. However, the alkyl group on the fused-ring compound should be no larger than the ethyl group, otherwise it will tend to migrate to the monocyclic compounds to some extent. Methyl-substituted compounds are preferred such as α-methyl naphthalene or β-methyl naphthalene, or mixtures thereof. An especially advantageous material consists of certain residual hydrocarbon mixtures, called "cycle oils," resulting from the thermal or catalytic cracking of petroleum stocks. Such mixtures are very refractory to further cracking operations because of their high aromatic content. Their gravity may range between about 14 and 25° API, and their boiling range between about 205 and 320° C. By fractional distillation, a cut may be isolated between about 240° and 250° C. which contains approximately 50% by weight of α- and β-methyl naphthalenes, 20–30% of other aromatics and 20–30% of non-aromatics. By utilizing this type of material, the methyl naphthalenes are selectively ethylated, thereby forming high-boiling derivatives which may be readily separated from the remaining aromatics and non-aromatics contained in the original cycle oil. The alkylated naphthalenes recovered may then be utilized as such, or they may be subjected to known dealkylating conditions to remove the ethyl groups, thereby providing substantially pure methyl naphthalenes. Higher boiling fractions from the same type of cracking cycle stock may be similarly utilized. Such higher boiling fractions may contain for example anthracene, phenanthrene and methylated derivatives thereof. The lower-boiling cuts may contain naphthalene.

The present invention embraces the use as alkyl acceptors of pure fused-ring aromatic hydrocarbons, or any material comprising substantial quantities thereof. Suitable fused-ring compounds include for example naphthalene, phenanthrene, anthracene, chrysene, picene and the like. A preferred sub-class comprises the monomethylated derivatives, as well as in some cases polymethylated derivatives. Ethylated derivatives may be employed to less advantage. If impure mixtures are employed, the non-fused-ring components thereof should be of such character as will not intefere with the desired course of reaction. The operative proportions of fused-ring compounds may range between about 1 and 50 moles per mole of ethylbenzene, and preferably between about 5 and 20 moles. It is further preferred that the quantity of fused-ring compound be in mole-excess of the total xylene components, thereby further inhibiting ethylation of the latter. If the proportion of fused-ring compounds is too small, more of the xylene will be ethylated, while too large a proportion is uneconomical from the standpoint of materials handling costs, and the cost of separation of the reaction products.

The operative catalysts employed herein may be divided into two general categories, each of which permits of somewhat different modes of operation. In the first category are placed those isomerization catalysts which are substantially neutral or only slightly acidic, and are made up primarily of adsorbent oxide-type materials having large surface areas. Such materials include for example alumina, silica, magnesia, thoria, zirconia, titania, and the like in the form of activated gels. Mixtures of alumina and silica are particularly desirable, either of the synthetic or natural clay type. A particularly desirable catalyst consists of co-precipitated alumina-silica gel containing between about 5% and 90% of silica, the remainder being alumina. Various natural clays such as bauxite, bentonite, pumice, and the like may be employed. The acid-activated bentonite-type clays are particularly desirable, such for example as are sold in the trade as "Filtrol" or "Superfiltrol." Such clays may contain from about 30% to 90% by weight of silica, the remainder being largely alumina. This type of catalyst may be augmented by the addition thereto of mildly acidic materials such as phosphoric acid or phosphorus pentoxide, or mixtures thereof. Anhydrous phosphorus pentoxide may also be employed alone as an absorbent oxide catalyst.

The trans-ethylation with the adsorbent oxide type catalysts may be carried out in either the liquid phase or vapor phase. Operative temperatures range between about 170°–450° C., and preferably between 190° and 300° C. Contact times may vary widely from about 1 minute to 4 hours, depending upon the temperature and the activity of the catalyst employed. Ordinarily, the pressures should be about atmospheric, but in some instances super-atmospheric pressures or sub-atmospheric pressures may be employed. Under conditions of high temperature, or where very active catalysts are employed, it may be desirable to admix with the feed mixture certain inert diluents such as steam, nitrogen, carbon dioxide and the like. Steam exerts a modifying action upon the catalyst, inhibiting destructive cracking reactions and promoting the transfer of ethyl groups. In vapor phase processes, from about 10% to 75% by volume of inert gases may be employed if desired.

The second category of operative catalysts comprises the more highly acidic isomerization catalysts, some of which are known in the art as Friedel-Crafts type catalysts, and some of which are heat-stable mineral acids. Examples of such catalysts include aluminum chloride, aluminum bromide, ferric chloride, zinc chloride, antimony trichloride, hydrogen chloride, hydrogen fluoride, sulfuric acid, concentrated phosphoric acid, boron trifluoride and the like. Mixtures of such materials may also be employed, and they may be employed either alone or supported on a suitable carrier such as silica gel, phosphorus pentoxide, activated charcoal, pumice, porcelain chips, clay sherds, etc. The operative reaction conditions for the acidic type catalysts are in general similar to those employed for the adsorbent oxide type catalysts, except that lower temperature ranges are necessary. With the most active acidic catalysts, such as aluminum chloride, temperatures as low as 50° C. may be employed, while with the less active members such as sulfuric acid or zinc chloride, temperatures as high as 260° C. may be employed. In general, the preferred range for such catalysts lies between about 75° and 200° C.

The reaction may be carried out either continuously or batch-wise, in single-stage or multi-stage operation. In continuous operation the liquid or vapor phase reactants may be passed through a stationary bed, or liquid body of catalyst, or they may be passed concurrently or countercurrently to compact moving beds or liquid streams of catalyst. Alternatively, in vapor phase operation, the well known fluidized catalyst type of operation may be employed wherein the catalyst is suspended under hindered settling conditions in the flowing reactants. In batch operation, the liquid reactants may simply be digested in contact with the granular or liquid catalyst. After long periods of operation the activity of the oxide-type catalysts may decline as a result of deposits of gum, carbon and other deactivating materials. Such deactivated catalysts may be regenerated by combusting in a stream of oxygen-containing gas at for example 400°–900° C.

According to another modification of a continuous process, the fused-ring compound may be maintained in the liquid phase, and the C-8 hydrocarbons may be passed therethrough in vapor phase. The liquid phase is maintained above the boiling point of the xylenes at operating pressure, and may be disposed, together with the catalyst, in a suitable vessel as a stationary body, or may be continuously gravitated downwardly in a bubble-plate column for example while the gaseous xylenes are bubbled counter-currently upwardly. This procedure automatically provides for maintaining a large mole-excess of fused-ring compound in the liquid phase. The overhead products may be continuously fractionated to recover benzene and ethylbenzene-free xylenes, while the bottoms from the bubble-plate column may be continuously fractionated to recover high-boiling ethylated materials. The catalyst may be stationary in the column, or may move downwardly with the liquid phase. This type of operation is particularly advantageous when the acidic type catalysts are employed, thereby permitting the use of low temperatures which are advantageously above the atmospheric boiling point of the xylenes but below that of the fused-ring compound. At temperatures above the boiling point of the fused-ring compound, super-atmospheric pressures will obviously be required to maintain a liquid phase.

The following examples may serve to illustrate some specific aspects of the invention, but are not intended to be limitative in character.

Example I

A mixture of C-8 hydrocarbons having the following composition by volume:

| | Percent |
|---|---|
| p-Xylene | 20 |
| m-Xylene | 48 |
| o-Xylene | 15 |
| Ethylbenzene | 17 | is obtained by fractional distillation of a gasoline which has been subjected to reforming conditions in the presence of a platinum-alumina catalyst. 1000 grams of this mixture is then admixed with 1350 grams of a mixture composed of 50 mole-percent naphthalene (640 gms.) and 50 mole-percent α-methyl naphthalene (710 gms.). The resulting mixture is then agitated and digested for 40 minutes at 275° C. in an autoclave in contact with 250 grams of a granular synthetic alumina-silica gel catalyst containing 80% by weight $SiO_2$ and 20% by weight of $Al_2O_3$. The resulting mixture is then subjected to fractional distillation, recovering overhead 112 grams of benzene, followed by 825 grams of mixed xylenes boiling between 138° and 144° C. Analysis of the xylene mixture shows the presence of less than 2% of ethylbenzene. The bottoms product from the distillation is then further fractionated to recover 580 grams of naphthalene and 568 grams of α-methyl naphthalene, showing that the methyl naphthalene was ethylated in preference to the naphthalene. The remaining still bottoms consists of mono- and di-ethylated methyl naphthalenes, together with a small proportion of ethylated naphthalene.

This example demonstrates that over 90% of the ethylbenzene may be converted to benzene with a 98% recovery of xylenes.

Example II

Another 1000 gram portion of the above mixture of C-8 hydrocarbons is admixed with 3200 grams of a narrow-boiling cut from a thermal cracker cycle stock, the cut boiling between 238° and 248° C. The original cycle oil has a gravity of 24° API and a boiling range of 220° to 280° C. Analysis of the 238-248° cut showed it to contain about 48% by weight of methyl naphthalenes, 24% of non-aromatics, and 28% of unidentified aromatic materials. The resulting mixture is then heated in an autoclave as described in Example I in contact with 400 grams of granular Filtrol catalyst. The resulting product is then fractionated to recover 97% of the original xylenes, containing less than 1% of ethylbenzene. Upon fractional distillation of the remaining bottoms product, 2986 grams of an overhead product boiling between 238° and 248° C. is obtained, leaving a residue which is found to boil above 250° C. Analysis of the high boiling residue shows that it consists predominantly of mono-ethyl- and the di-ethyl-methyl-naphthalenes. By subjecting this material to selective de-alkylation conditions, a mixture of α- and β-methyl naphthalenes is obtained predominating in the α-isomer.

This example demonstrates the feasibility of utilizing the herein described invention to not only remove ethylbenzene from xylene stocks, but also to recover effectively methyl naphthalenes from complex high-boiling stocks which are likewise difficult to resolve into their components. The methyl naphthalenes themselves are useful materials in the chemical arts as intermediates for dyestuffs, pharmaceuticals and the like.

Example III

This example illustrates the results obtainable by countercurrent contacting of liquid phase naphthalene with gaseous C-8 hydrocarbons in the presence of ferric chloride catalyst.

The ferric chloride catalyst is prepared by pulverizing anhydrous $FeCl_3$ containing less than 1% by weight of water. The powdered catalyst is then suspended in molten naphthalene, employing 15 gms. of catalyst per 100 gms. of naphthalene. The resulting slurry is then heated with agitation to 175° C., and trickled downwardly through a bubble-plate column containing 12 trays at the rate of about 5 ml. per minute. The preheated, (175° C.) vaporized feed mixture of Example I is passed upwardly at a rate sufficient to provide an average vapor-liquid contact time of about 30 minutes. Analysis of the overhead product indicates a 99% recovery of xylenes containing about 0.6% ethylbenzene. The ethylated naphthalene-catalyst slurry collected at the bottom of the column is filtered to remove the catalyst, and the liquid is fractionated to recover unreacted naphthalene. The catalyst may then be mixed with fresh or recovered naphthalene and again passed through the column.

The vapor-liquid contacting process of this example is capable of giving a bottoms product which is 50–70% by volume of ethylated naphthalenes. The trans-ethylation of naphthalene may be carried to this extent by virtue of the fact that the xylene concentration is very low at all times in the liquid phase, and also because no catalyst is present in the vapor phase. Both of these factors minimize ethylation of xylenes, as well as the reethylation of benzene.

The ferric chloride catalyst of this example, as well as other Friedel-Crafts type catalysts, may be further activated by the addition of a halogen acid, or small proportions of water, thereby permitting the use of lower temperatures and/or shorter contact times. An advantageous method for activating such catalysts consists in adding small amounts of gaseous HCl or $H_2O$ to the xylene vapors, e. g. 0.5% to 5% by volume. In this manner, the maximum catalytic activity is assured only in zones where ethylbenzene and naphthalene are intimately admixed, and trans-alkylation is desired, while a lesser catalytic activity will prevail in zones which are relatively free of one of those reactants, and where trans-alkylation is therefore not desired.

Substantially similar results are obtained when other acidic catalysts are substituted for $FeCl_3$ in the above example. Sulfuric acid for example may be employed under the same or similar temperature conditions, while with aluminum chloride somewhat lower temperatures are preferable, e. g. 140–150° C. Shorter contact times may also be utilized with $AlCl_3$, e. g. 5–15 minutes.

While the above examples are limited to specific conditions and proportions, it is contemplated that those factors may be varied considerably to obtain substantially similar results. The foregoing disclosure is therefore not to be considered as limiting, since many variations may be made by those skilled in the art without departing from the scope or spirit of the following claims:

I claim:

1. A process for removing ethylbenzene from a mixture thereof with at least one xylene isomer which comprises subjecting said mixture to a temperature between about 50° and 260° C. in the presence of an isomerization catalyst and a mole-excess, relative to ethylbenzene, of a fused-ring aromatic hydrocarbon, whereby ethyl groups are selectively transferred from ethylbenzene to said fused-ring hydrocarbon, and thereafter recovering xylene depleted in ethylbenzene, said isomerization catalyst being selected from the group consisting of heat-stable mineral acids and Friedel-Crafts halide catalysts.

2. A process according to claim 1 wherein said fused-ring aromatic hydrocarbon is substituted with a methyl group.

3. A process according to claim 1 wherein said fused-ring aromatic hydrocarbon is a methylated naphthalene.

4. A process according to claim 1 wherein said fused-ring aromatic hydrocarbon is naphthalene.

5. A process for removing ethylbenzene from a mixture thereof with at least one xylene isomer which comprises subjecting said mixture in vapor phase and at a temperature between about 50° and 260° C. to simultaneous contact with (1) an acidic isomerization catalyst selected from the group consisting of heat-stable mineral acids and Friedel-Crafts halide catalysts, and (2) between about 1 and 50 moles per mole of ethylbenzene of a liquid fused-ring aromatic hydrocarbon, continuing said contacting for a sufficient length of time to transfer substantially all of the ethyl groups from ethylbenzene to said fused-ring hydrocarbon, and thereafter recovering substantially ethylbenzene-free xylene.

6. A process according to claim 5 wherein said fused-ring aromatic hydrocarbon is substituted with a methyl group.

7. A process according to claim 5 wherein said fused-ring aromatic hydrocarbon is a methylated naphthalene.

8. A process according to claim 5 wherein said fused-ring aromatic hydrocarbon is naphthalene.

9. A process as defined in claim 5 wherein said catalyst is ferric chloride.

10. A process as defined in claim 5 wherein said catalyst is sulfuric acid.

11. A process as defined in claim 5 wherein said catalyst is aluminum chloride.

12. A process as defined in claim 5 wherein said vapor phase mixture of ethylbenzene and xylene is passed counter-currently to a descending stream of said liquid fused-ring aromatic hydrocarbon.

13. A process as defined in claim 5 wherein said catalyst is maintained substantially wholly in said liquid phase fused-ring hydrocarbon, and is substantially excluded from said vapor phase hydrocarbon mixture.

References Cited in the file of this patent
UNITED STATES PATENTS

| | | |
|---|---|---|
| 2,385,524 | Mattox | Sept. 25, 1945 |
| 2,411,530 | Dreisbach et al. | Nov. 26, 1946 |
| 2,447,479 | Salt | Aug. 17, 1948 |
| 2,734,930 | Schlatter | Feb. 14, 1956 |